June 10, 1969 C. MONIN 3,449,590

MAGNETOSTATIC RELAY ARRANGEMENT

Filed June 8, 1965

INVENTOR
CLAUDE MONIN
BY Paul M. Craig, Jr.
ATTORNEY

United States Patent Office 3,449,590

Patented June 10, 1969

3,449,590
MAGNETOSTATIC RELAY ARRANGEMENT

Claude Monin, Villennes-sur-Seine, France, assignor to CIT—Compagnie Industrielle des Telecommunications, Paris, France, a French corporation Filed June 8, 1965, Ser. No. 462,197
Claims priority, application France, June 15, 1964, 978,314
Int. Cl. H01f 27/42
U.S. Cl. 307—88 10 Claims

ABSTRACT OF THE DISCLOSURE

A magnetostatic relay including a magnetic amplifier having a load winding connected directly to the base of a transistor via a rectifier, the transistor emitter being connected to ground.

The present invention relates to control and memory arrangements which may be utilized in all techniques concerned with automation and more particularly in telecommunications, remote control and remote signalling.

Applicant has previously found that a magnetostatic relay comprising a transistor associated with a magnetic amplifier is very beneficial and useful; however, although the operation of this known arrangement is fully satisfactory, improvements may be made to the organization, easiness of use, operating speed and cost of said arrangement by bringing about changes well suited to the performance required.

In this prior known arrangement provided by applicant, the output current can take two well-defined values according to the control ampere-turns provided by the magnetic amplifier; one of these values is zero, the other is a nonzero constant. A minimum current range of the magnetic amplifier corresponds to the zero value of the output current for which the transistor is blocked, while a high current range of the magnetic amplifier corresponds to the nonzero constant value of the output current for which the transistor is conducting. Because of this feature of the known device, a resistor is inserted between the transistor base and the input branch point from the magnetic amplifier so as to limit the emitter-base current.

Moreover, the routing, in the prior known device, of the negative half-waves of the magnetic amplifier output current to the transistor base leads to a negative biasing of the emitter (hence, a special supply source) in order to block the transistor when the amplifier current is small.

The main object of the present invention is to provide a magneto-static relay of more simplified construction, lower cost and quicker operation. It comprises a magnetic amplifier, the load winding output of which is directly connected to the transistor base via a rectifier, the transistor emitter being connected to ground.

The arrangement according to the invention dispenses with both the magnetic biasing of the emitter and the insertion of a resistor on the transistor base as required in the prior known arrangement. This results from the fact that in the arrangement according to the invention, the transistor is made conducting for the lowest current range of the magnetic amplifier and that it is blocked for the high current range, by using the positive half-waves of the magnetic amplifier output current.

The arrangement according to the invention therefore makes it possible to eliminate one heretofore necessary voltage supply source, namely that of the emitter which is now simply grounded.

Another advantage offered by the arrangement according to the invention is that the output current is equal to zero when the magnetic amplifier control ampere-turns have a zero value.

Another feature of the arrangement according to the invention is that it comprises a smoothing capacitor connected in parallel between the transistor base and ground. As the base voltage varies, the corresponding capacitor charge variations take place in a circuit which does not include the transistor and this makes it possible to dispense with the heretofore required limiting resistor at the transistor collector.

Another advantage resulting from the above-mentioned arrangement is that a much shorter time of operation of the relay may be obtained. This results mainly from the fact that, as the smoothing capacitor is located at the base rather than at the collector, the time of operation is divided by the gain.

Other features and advantages of the invention will be apparent from the following description of an embodiment of a relay according to the invention, with reference to the accompanying drawings, in which.

Figure 1:
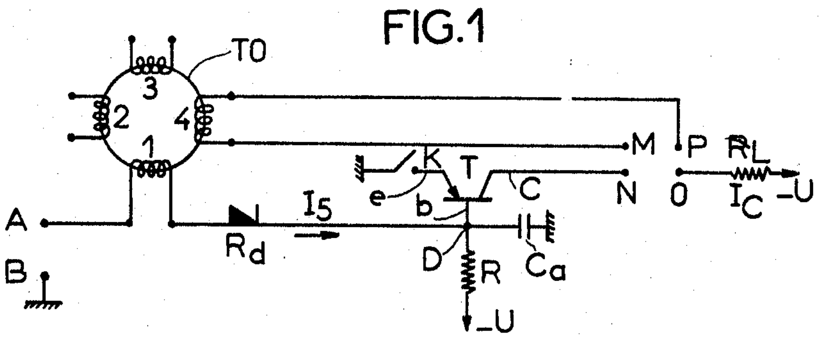
FIGURE 1 is a wiring diagram of a relay according to the invention.

The relay shown in FIGURE 1 comprises a saturable magnetic core TO on which several windings such as 1–2–3–4, etc., are wound. The winding 1, in series with a rectifier R*d*, is fed from an A.C. supply source AB, the rectifier R*d* being mounted in a direction such that it allows only the positive half-waves to pass. Direct currents flow in the windings 2, 3, 4, etc.; the winding 2 is a control winding and there are generally, in fact, not only one but several control windings such as 2; the winding 3 is a bias winding which, incidentally, may be omitted if desired. The winding 4 is a feedback winding which may also be omitted; in any case, the term "control ampere-turns" will designate the algebraic sum of the ampere-turns of the windings 2, 3, 4.

The winding 1 is connected, through the rectifier R*d* to a point D common to the base *b* of a transistor T. The point D is connected to one of the plates of a capacitor C*a* the other plate of which is connected to ground; the point D is also connected to a resistor R, the other end of which is connected to the negative polarity of a D.C. supply source U.

The emitter *e* of the transistor is connected to ground via switch K and the collector C of the transistor is connected through the contact studs NQ and a load resistor $R_L$ to the negative polarity of the D.C. supply source U. In this case, the transistor is assumed to be of the PNP type but it is obvious that an NPN transistor could be used by making the necessary polarity adjustments. In the case of a PNP transistor, the orientation of the rectifier R*d* is such that it will only pass the positive half-waves coming from the magnetic amplifier.

If the contact NQ is opened and the contacts NM and QP closed, the feedback winding 4 becomes series-inserted with the collector and the resistor $R_L$.

Figure 2:
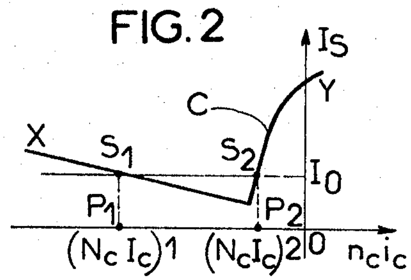
FIGURES 2 and 3 are curves relating to the operation of arrangement according to FIGURE 1.

The curve C of FIGURE 2 is the curve giving the value of the output current $I_S$ of the magnetic amplifier as a function of the algebraic sum of the control ampere-turns $n_c i_c$.

When a current $I_S$ flows from the amplifier TO through R*d*, the potential of point D (FIGURE1) is given by:

$$V_D = -U + RI_S$$

It may be seen that this potential is either positive or negative depending upon whether $RI_S$ is larger or smaller, in absolute value, than U; that is, if $I_S$ is large, point D potential tends to become positive and if $I_S$ is low, point D potential tends to become negative. Point D potential is equal to zero for a value $I_0$ given by $I_0=U/R$. It will be assumed that the $I_0$ value is that shown in FIGURE 2 by the line parallel to the axis $n_ci_c$; this line intersects the curve C in two points $S_1$ and $S_2$ which correspond respectively to the ampere-turn values $(N_CI_C)_1$, at point $P_1$ and $(N_CI_C)_2$ at point $P_2$.

It is seen that if the control ampere-turns are bracketed between $P_1$ and $P_2$, the magnetic amplifier current is low and, as a result the potential $V_D$ of Point D is negative; on the other hand, if the control ampere-turns are smaller than $(N_CI_C)_1$ or larger than $(N_CI_C)_2$, the output current $I_S$ is larger than $I_0$ and, consequently, point D potential is positive.

Thus, depending upon whether the control ampere-turns of the magnetic amplifier are bracketed between $P_1$ and $P_2$ or are outside this range, point D potential is negative or positive, respectively.

It will then be assumed that the switch K is closed and the NQ contacts interconnected. The transistor T (PNP type) is conducting if the emitter voltage is more positive than that of the base; now, the emitter voltage is that of ground (zero voltage). Consequently, it is obvious that if point D potential is negative, the transistor will be conducting and if point D is positive, the transistor will be blocked.

Figure 3:
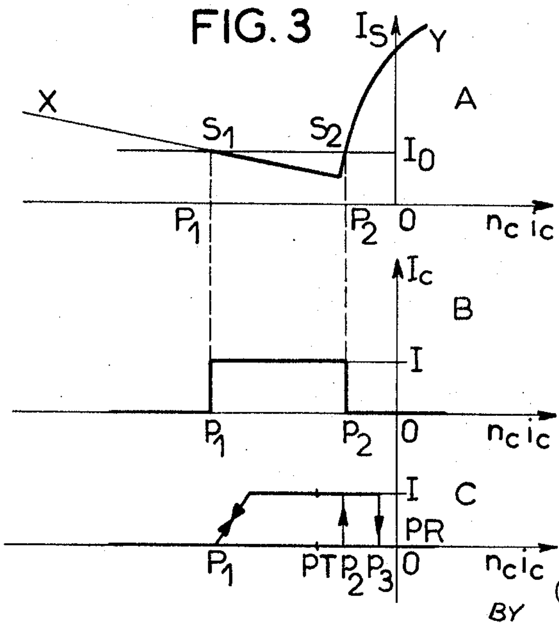

In FIGURE 3, if lines are drawn through points $S_1$ and $S_2$ perpendicularly to the axis $n_ci_c$, points $P_1$ and $P_2$ are obtained at the intersection with the axis $n_ci_c$ in the graphs A and B, the graph A giving $I_S$ as a function of the control ampere-turns and the graph B giving the collector current $I_C$ as a function of the same control ampere-turns.

Since the transistor is conducting for ampere-turn values in the range $S_1$ to $S_2$, it delivers a saturation current I approximately equal to $U/R_L$.

If the control ampere-turn values are smaller than $P_1$ or larger than $P_2$, the transistor is blocked and the current $I_C$ is zero. Hence, it is seen that there is a zero output current when the control ampere-turns are zero.

To summarize:

If the magnetic amplifier output current is larger than $I=U/R$, i.e., for the parts $XS_1$ and $S_2Y$ of the curve, the transistor is blocked and delivers no current.

If the magnetic amplifier output current is smaller than $I_0=U/R$, i.e., for the part of the curve C comprised between $S_1$ and $S_2$, the transistor is conducting, and saturated, and it delivers a current I approximately equal to $U/R_L$.

In the diagram of FIGURE 1, if the contacts NM and PQ are interconnected by breaking the contact NQ previously made, the feedback ampere-turns delivered by the winding 4 alter the response curve of the output current at the collector, as shown in FIGURE 3C.

If the ampere-turns delivered by the feedback winding are positive, the rise always occurs at point $P_2$ but the fall does not occur for ampere-turn values comprised betwen $P_2$ and $P_3$ ($P_3$ corresponding to a number of ampere-turns algebraically larger than $P_2$) and ampere-turn values larger than $P_3$ are required for the fall to occur. Thus is obtained a bistable arrangement which becomes operating for ampere-turn values smaller than $P_2$ (for instance $P_T$) and which comes to rest for ampere-turn values larger than $P_3$ (for instance $P_R$), any variations between $P_2$ and $P_3$ having no effect on the operating state achieved.

At point $P_1$, the transition to the value I is progressive when the arrangement is coming to operating condition as well as when it returns to the rest state.

Since the algebraic sum of the control ampere-turns depends upon the supply and the polarity of the supply to the windings 2, 3, and 4, there is achieved a means for expressing by only two values of the output current $I_C$ of the arrangement the complex and many making and breaking conditions elaborated by the windings 2 to 4. Furthermore, if the output current $I_C$ is utilized for the control windings of one or several similar arrangements, one may thus achieve any automation diagram in a similar manner as what was so far achieved with electromagnetic relays. Such arrangements, however, are much more sensitive and much quicker than the electromagnetic relays. In addition, the amount of energy required for their operation is much smaller.

It is evident that various modifications and changes may be made in the embodiment of the invention herein illustrated and described without departing from the spirit or scope of the invention.

In particular, it is obvious that although reference is made of a PNP type transistor, an NPN type transistor could be used similarly, by reversing the current supply polarities and the direction of the diodes.

I claim:

1. A magnetostatic relay comprising:
a magnetic amplifier including a load winding and at least one control winding,
a transistor having a base electrode, an emitter electrode and a collector electrode, and
a rectifier directly connecting said load winding to the base electrode of said transistor,
an A.C. supply source connected to the load winding of said magnetic amplifier,
means for connecting said emitter electrode of said transistor to a first potential source, impedance means for connecting said base electrode of said transistor to a second potential source, a capacitor interconnecting said base and said first potential source,
a load circuit including a load impedance interconnecting said collector electrode of said transistor with said second potential source.

2. A magnetostatic relay comprising:
a magnetic amplifier including a load winding and at least one control winding,
a transistor having a base electrode, an emitter electrode and a collector electrode, and
a rectifier directly connecting said load winding to the base electrode of said transistor,
an A.C. supply source connected to the load winding of said magnetic amplifier,
means for connecting said emitter electrode of said transistor to a first potential source, impedance means for connecting said base electrode of said transistor to a second potential source, a capacitor interconnecting said base and said first potential source,
a load circuit including a load impedance interconnecting said collector electrode of said transistor with said second potential source,
said rectifier being connected so as to pass only positive portions of the magnetic amplifier output current, said first potential source being at ground potential and said second potential source being of negative polarity.

3. A magnetostatic relay comprising:
a magnetic amplifier including a load winding and at least one control winding,
a transistor having a base electrode, an emitter electrode and a collector electrode, and
a rectifier directly connecting said load winding to the base electrode of said transistor,
an A.C. supply source connected to the load winding of said magnetic amplifier,
means for connecting said emitter electrode of said transistor to a first potential source, impedance means for connecting said base electrode of said transistor to a second potential source, a capacitor interconnecting said base and said first potential source,
a load circuit including a load impedance interconnecting said collector electrode of said transistor with said second potential source,
said rectifier being connected so as to pass only positive portions of the magnetic amplifier output current, said first potential source being at ground potential and said second potential source being of negative polarity,
said load impedance comprising at least one control winding of an additional magnetostatic relay.

4. A magnetostatic relay comprising:
a magnetic amplifier including a load winding and at least one control winding,
a transistor having a base electrode, an emitter electrode and a collector electrode, and
a rectifier directly connecting said load winding to the base electrode of said transistor,
an A.C. supply source connected to the load winding of said magnetic amplifier,
means for connecting said emitter electrode of said transistor to a first potential source, impedance means for connecting said base electrode of said transistor to a second potential source, a capacitor interconnecting said base and said first potential source,
a load circuit including a load impedance interconnecting said collector electrode of said transistor with said second potential source,
feedback winding means coupled to said magnetic amplifier and connected in series with said collector electrode of said transistor and said load impedance.

5. A magnetostatic relay comprising:
a magnetic amplifier including a load winding and at least one control winding,
a transistor having a base electrode, an emitter electrode and a collector electrode, and
a rectifier directly connecting said load winding to the base electrode of said transistor,
an A.C. supply source connected to the load winding of said magnetic amplifier,
means for connecting said emitter electrode of said transistor to a first potential source, impedance means for connecting said base electrode of said transistor to a second potential source, a capacitor interconnecting said base and said first potential source,
a load circuit including a load impedance interconnecting said collector electrode of said transistor with said second potential source,
said rectifier being connected so as to pass only positive portions of the magnetic amplifier output current, said first potential source being at ground potential and said second potential source being of negative polarity,
said load impedance comprising at least one control winding of an additional magnetostatic relay,
feedback winding means coupled to said magnetic amplifier and connected in series with said collector electrode of said transistor and said load impedance.

6. A magnetostatic relay comprising:
a magnetic amplifier including a load winding, an A.C. supply source connected to said load winding, and at least one control winding,
transistor switch means providing an output signal at saturation level in response to current control below a predetermined current level and being cut-off in response to current control above said predetermined current level, and
rectifier means connecting said load winding of said magnetic amplifier to said transistor switch means for providing said current control,
said transistor switch means including a transistor having base, emitter and collector electrodes, capacitor means connecting said base electrode to a first potential, resistor means connecting said base electrode to a second potential, and switch means connecting said emitter to said first potential.

7. A magnetostatic relay comprising:
a magnetic amplifier including a load winding, an A.C. supply source connected to said load winding, and at least one control winding,
transistor switch means providing an output signal at saturation level in response to current control below a predetermined current level and being cut-off in response to current control above said predetermined current level, and
rectifier means connecting said load winding of said magnetic amplifier to said transistor switch means for providing said current control,
said transistor switch means including a transistor having base, emitter and collector electrodes, capacitor means connecting said base electrode to a first potential, resistor means connecting said base electrode to a second potential, and switch means connecting said emitter to said first potential,
a feedback winding coupled to said magnetic amplifier and connected in series with the collector electrode of said transistor.

8. A magnetostatic relay comprising:
a magnetic amplifier including a load winding, an A.C. supply source connected to said load winding, and at least one control winding,
transistor switch means providing an output signal at saturation level in response to current control below a predetermined current level and being cut-off in response to current control above said predetermined current level, and
rectifier means connecting said load winding of said magnetic amplifier to said transistor switch means for providing said current control,
said transistor switch means including a transistor having base, emitter and collector electrodes, capacitor means connecting said base electrode to a first potential, resistor means connecting said base electrode, to a second potential and switch means connecting said emitter to said first potential,
said rectifier being connected so as to pass only positive portions of the magnetic amplifier output current, said first potential source being at ground potential and said second potential source being of negative polarity.

9. A magnetostatic relay comprising:
a magnetic amplifier including a load winding, an A.C. supply source connected to said load winding, and at least one control winding,
transistor switch means providing an output signal at saturation level in response to current control below a predetermined current level and being cut-off in response to current control above said predetermined current level, and
rectifier means connecting said load winding of said magnetic amplifier to said transistor switch means for providing said current control,
said transistor switch means including a transistor having base, emitter and collector electrodes, capacitor means connecting said base electrode to a first potential, resistor means connecting said base electrode, to a second potential and switch means connecting said emitter to said first potential,
said rectifier being connected so as to pass only positive portions of the magnetic amplifier output current, said first potential source being at ground potential and said second potential source being of negative polarity,
a load circuit including a load impedance interconnecting said collector electrode of said transistor with said second potential source.

10. A magnetostatic relay comprising:
a magnetic amplifier including a load winding, an A.C. supply source connected to said load winding, and at least one control winding,
transistor switch means providing an output signal at saturation level in response to current control below a predetermined current level and being cut-off in response to current control above said predetermined current level, and
rectifier means connecting said load winding of said magnetic amplifier to said transistor switch means for providing said current control, said transistor switch means including a transistor having base, emitter and collector electrodes, capacitor means connecting said base electrode to a first potential, resistor means connecting said base electrode to a second potential and switch means connecting said emitter to said first potential, said rectifier being connected so as to pass only positive portions of the magnetic amplifier output current, said first potential source being at ground potential and said second potential source being of negative polarity, a load circuit including a load impedance interconnecting said collector electrode of said transistor with said second potential source, said load impedance comprising at least one control winding of an additional magnetostatic relay.

References Cited

UNITED STATES PATENTS

| | | | |
|---|---|---|---|
| 2,991,374 | 6/1961 | De Miranda et al. | 307—88 X |
| 3,001,090 | 9/1961 | Tulp | 307—88 |
| 3,046,531 | 7/1962 | Armata | 307—88 X |
| 3,063,038 | 11/1962 | Davis et al. | 340—174 |
| 3,085,234 | 4/1963 | Monin | 307—88X |

STANLEY M. URYNOWICZ, Jr., *Primary Examiner.*